US006721580B1

(12) United States Patent
Moon

(10) Patent No.: US 6,721,580 B1
(45) Date of Patent: Apr. 13, 2004

(54) ENSURING EMERGENCY AVAILABILITY OF COMMUNICATIONS DEVICES

(75) Inventor: Billy G. Moon, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 409 days.

(21) Appl. No.: 09/698,617

(22) Filed: Oct. 27, 2000

(51) Int. Cl.[7] ............................... H04B 1/38; H04B 1/16
(52) U.S. Cl. ................. 455/574; 455/127.5; 455/343.2; 455/404.1; 340/693.2
(58) Field of Search ........................... 455/404.1, 572, 455/574, 127.1, 343.1, 345, 67.1, 67.7, 573, 522, 343.2, 345.5, 127.5; 340/7.37, 693.2, 7.32

(56) References Cited

U.S. PATENT DOCUMENTS

| 5,563,931 | A | | 10/1996 | Bishop et al. ................. 379/59 |
| 5,870,685 | A | * | 2/1999 | Flynn .......................... 455/573 |
| 6,014,722 | A | | 1/2000 | Rudin et al. ................. 710/240 |
| 6,121,923 | A | | 9/2000 | King .......................... 342/357 |
| 6,240,285 | B1 | | 5/2001 | Blum et al. .................. 455/404 |
| 6,275,712 | B1 | * | 8/2001 | Gray et al. .................. 455/522 |
| 6,314,308 | B1 | * | 11/2001 | Sheynblat et al. .......... 455/574 |
| 6,330,463 | B1 | * | 12/2001 | Hedrich ....................... 455/573 |
| 6,345,180 | B1 | * | 2/2002 | Reichelt ...................... 455/404 |
| 6,408,172 | B1 | * | 6/2002 | Alperovich et al. ......... 455/404 |
| 6,427,072 | B1 | * | 7/2002 | Reichelt ...................... 455/404 |
| 6,501,949 | B1 | | 12/2002 | Singleton .................... 455/422 |

* cited by examiner

Primary Examiner—Edward F. Urban
Assistant Examiner—Simon Nguyen
(74) Attorney, Agent, or Firm—Baker Botts L.L.P.

(57) ABSTRACT

A communications apparatus includes an energy storage device, such as a backup battery, that provides power in certain circumstances, such as when an external power supply is not available. The communications device determines an emergency threshold that provides sufficient power to communicate emergency information. The communications device also monitors the energy level remaining in the energy storage device and provides communications services so long as the energy level remaining in the energy storage device exceeds the emergency threshold.

20 Claims, 3 Drawing Sheets

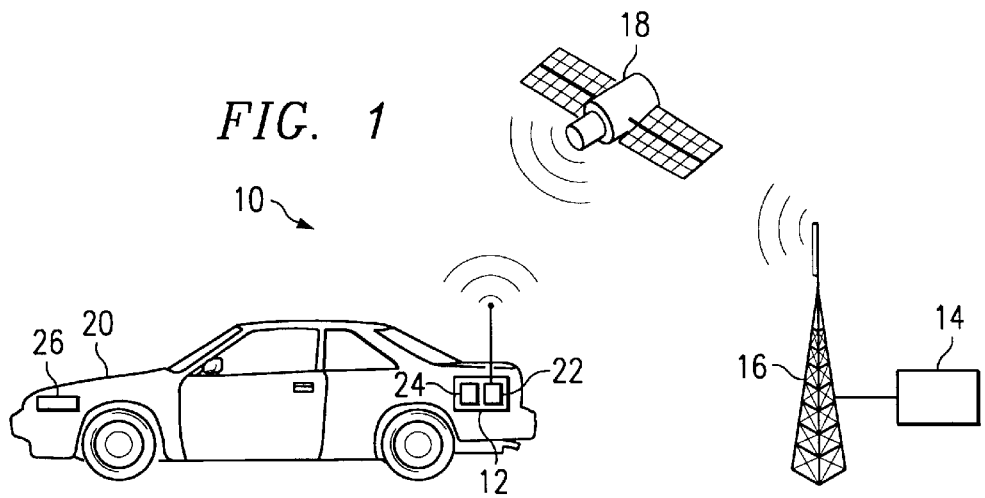
FIG. 1
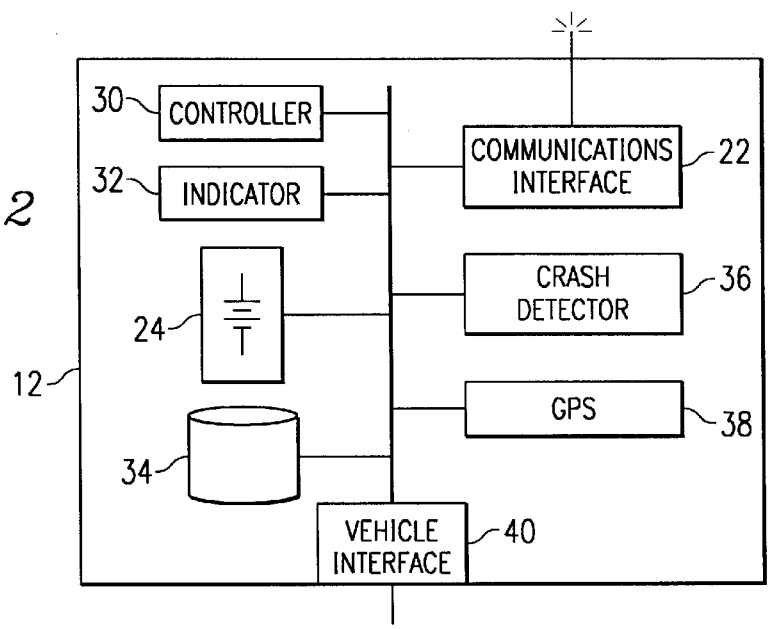
FIG. 2
FIG. 3
| | | SERVICES | POWER SOURCE | |
|---|---|---|---|---|
| ENERGY LEVEL IN STORAGE DEVICE | MAX — | | | — MAX |
| | | FULL WIRELESS SERVICES | BACKUP BATTERY | OPERATIONAL THRESHOLD |
| | RESTRICTED USE THRESHOLD | | | |
| | | RESTRICTED WIRELESS SERVICES | CAR | |
| | EMERGENCY THRESHOLD | | | |
| | | EMERGENCY WIRELESS SERVICES | | |
| | MIN — | | | — MIN |

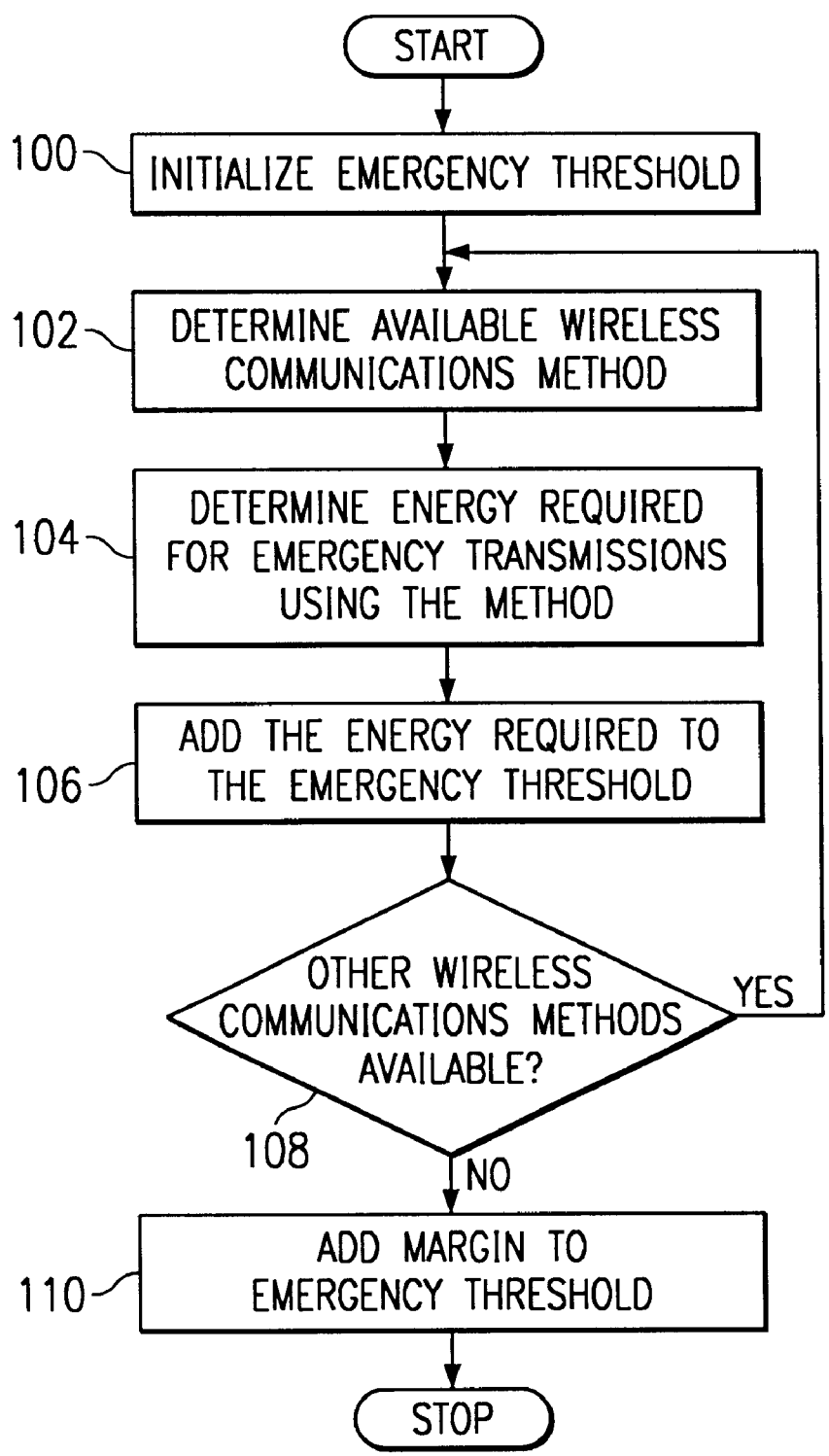

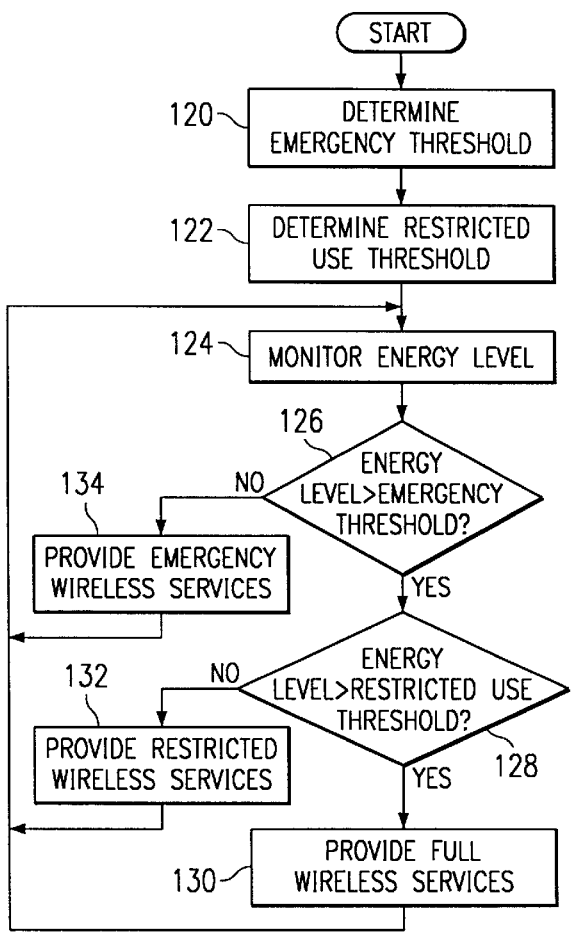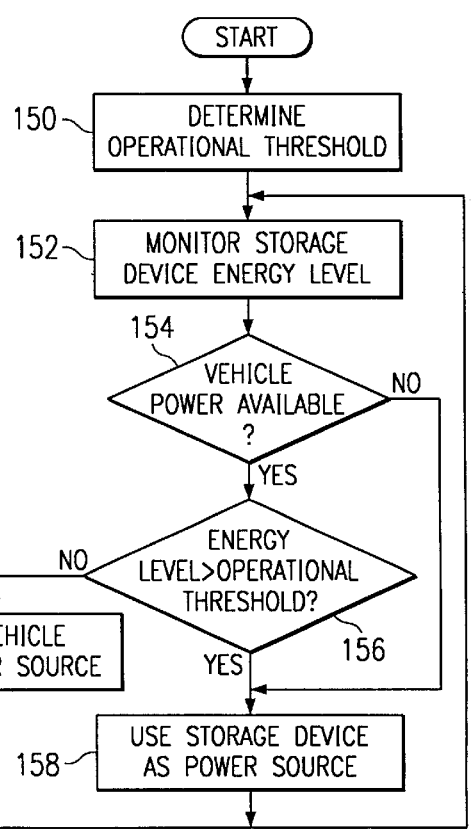

US 6,721,580 B1

ENSURING EMERGENCY AVAILABILITY OF COMMUNICATIONS DEVICES

TECHNICAL FIELD OF THE INVENTION

The present invention relates generally to emergency communications devices and more particularly to ensuring emergency availability of communications devices.

BACKGROUND OF THE INVENTION

Many new vehicles include systems that provide interactive voice and data services. These systems typically include modems for communicating data, cellular phones for establishing links to call centers, and a backup battery. The backup battery provides an alternative power source if the primary vehicle battery is damaged, disabled, or discharged and if power from the vehicle's alternator is not available. These systems typically offer a host of available services ranging from informational assistance, such as driving directions, to critical services, such as emergency transmissions in the event of an accident. When no other power source is available, the system provides these various services using power from the backup battery. However, this permits non-critical services, such as routine transmissions of location information, to slowly drain the backup battery when other power sources are unavailable. Thus, in the event of an emergency, the backup battery may be unable to provide sufficient power for emergency communications.

SUMMARY OF THE INVENTION

In accordance with the present invention, techniques for ensuring emergency availability of communications devices are provided which substantially eliminate or reduce disadvantages and problems associated with previous techniques. In a particular embodiment, the present invention satisfies a need for a communications device that controls access to various services to ensure that sufficient power remains available in emergency situations.

According to one embodiment of the present invention, an apparatus includes a wireless device, an energy storage device, and a controller. The wireless device provides wireless communications, and the energy storage device provides power for the wireless device and reports an energy level indicating remaining energy for the energy storage device. The controller determines an emergency threshold to provide sufficient power to communicate emergency information using the wireless device, monitors the energy level, and provides wireless services using the wireless device if the energy level exceeds the emergency threshold.

In accordance with another embodiment of the present invention, a method for controlling wireless communications determines an emergency threshold that provides sufficient power for a wireless device to communicate emergency information, monitors an energy level for an energy storage device, and provides wireless services using the wireless device if the energy level exceeds the emergency threshold.

The invention provides a number of technical advantages. When a communications device uses a backup power source to provide power for services, the device can monitor the remaining energy level of the backup power source and provide different levels of service, scaling back services when appropriate to ensure that sufficient power remains for emergency situations. Thus, the device can prevent the backup power source from being completely drained when being used to power routine or non-critical services. For example, if the remaining energy in a backup battery drops below some threshold, a communications device may limit access to all services except emergency communications.

To determine various levels of service, communications devices may use one or more thresholds. For example, a device may use a single emergency threshold that provides sufficient power for emergency communications. When using power from a backup power source, the device provides full services if the power level remaining in the backup source is above the emergency threshold and can restrict these services if the power level drops below the threshold. Thresholds used may be programmable based on determinations of the communications device or based on commands received from remote devices.

In addition, thresholds may be determined based on communications methods available for emergency transmissions. For example, a threshold for a communications device having only satellite communications available may be significantly higher than a communications device having access to a wireless local area network. In addition, a threshold may account for multiple different available communications methods. For example, an emergency threshold may provide sufficient power for attempts at both satellite and cellular emergency transmissions. Furthermore, monitoring the backup energy available allows systems to provide warnings indicating, for example, that a backup battery needs replacing.

In addition to providing different levels of service based on an available energy level, the system may also use the available energy level of a backup battery to select between available power supplies. For example, alternators and primary vehicle batteries typically provide fluctuating and noisy power supplies, while the backup battery may provide a clean and stable power source. Thus, so long as the energy level of the backup battery remains above some operational threshold, the system can provide services using the backup battery as the power source.

Other technical advantages of the present invention will be readily available to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIG. 1 illustrates a communications system including a communications apparatus that preserves backup power to ensure emergency availability;

FIG. 2 is a block diagram illustrating exemplary functional components for the communications apparatus;

FIG. 3 is a diagram illustrating various thresholds used by the communications apparatus to determine levels of service and to select between power supplies;

FIG. 4 is a flowchart illustrating a method for determining an emergency threshold;

FIG. 5 is a flowchart illustrating a method for determining a level of service for the communications apparatus; and FIG. 6 is a flowchart illustrating a method for selecting between available power supplies.

DETAILED DESCRIPTION OF THE DRAWINGS

FIG. 1 illustrates a communications system, indicated generally at 10, including a communications apparatus 12, a call center 14, a base transceiver station 16, and a satellite 18. Apparatus 12, housed within a vehicle 20, includes a communications interface 22 and an energy storage device 24. In general, apparatus 12 provides communications services and controls access to those services to ensure that sufficient power remains available in storage device 24 for emergency situations. More specifically, communications apparatus 12 may limit services when the remaining energy level of storage device 24 drops below a threshold.

Apparatus 12 represents any device or collection of components providing services including transmissions or communications in emergency situations. While this example illustrates apparatus 12 within vehicle 20, apparatus 12 may be a standalone device or may be incorporated into any suitable system. In this illustration, vehicle 20 includes apparatus 12 and a primary power supply 26. Power supply 26 represents an alternator, battery, and/or other device for supplying power to apparatus 12. Call center 14 represents a remote destination for communications from apparatus 12. For example, call center 14 may be a central office, end office, or other suitable communications equipment that provides information and emergency services for subscribers of a vehicle services system.

For apparatus 12, storage device 24 may provide a backup energy source when power supply 26 is damaged, destroyed, or disabled. Storage device 24 represents any rechargeable or non-rechargeable device for storing and providing energy. Moreover, storage device 24 also provides an internal metering capability that can measure and report the remaining energy in storage device 24. For example, storage device 24 may be a "smart" battery with an interface for coupling to the power source and an interface, such as a serial bus, for receiving reports on the remaining energy. In addition to storage device 24, apparatus 12 includes interface 22, which couples apparatus 12 to remote devices using any suitable terrestrial or satellite-based, wireless or wireline communications protocols. For example, apparatus 12 may establish wireless communications with station 16 or satellite 18 using interface 22.

Station 16 provides digital and/or analog wireless communications for devices such as apparatus 12. Satellite 18 provides a communications link for devices such as apparatus 12 that support satellite communications. Together, satellite 18 and station 16 represent two alternate methods for providing wireless communications with apparatus 12. However, system 10 contemplates apparatus 12 using any number and type of suitable methods for communications. Thus, for example, apparatus 12 may communicate using techniques such as wireless local area networks (LANs), satellite up-links, analog or digital wireless communications, and/or any other suitable communications methods. In addition, while these techniques for ensuring emergency power are particularly suited to wireless devices, which typically rely on batteries, these techniques may be used in any suitable situation to control access to functions and features of a device to preserve sufficient power for emergency operations. Therefore, system 10 contemplates apparatus 12 communicating using any suitable wireless or wireline protocols.

In operation, apparatus 12 may provide an array of various services, such as wireless communications, navigational systems, concierge services, informational assistance, remote access to vehicle 20 (e.g., by unlocking a door), remote diagnostics of vehicle 20, crash notifications to call center 14, and/or other suitable services. To provide these services, apparatus 12 may draw power from power supply 26 or storage device 24. Based on the energy level remaining in storage device 24, apparatus 12 may control access to services and select between available power supplies. To ensure availability in an emergency, apparatus 12 controls access to the various available services based on the remaining energy level of storage device 24. To determine the services to provide, apparatus 12 establishes thresholds, queries storage device 24 to determine the remaining energy, and determines a service level by comparing the remaining energy level to the thresholds. However, so long as energy from power supply 26 remains available, apparatus 12 may provide services using power from power supply 26 regardless of the energy level remaining in storage device 24.

While different embodiments may provide varying levels of service based upon different thresholds, at a minimum, apparatus 12 uses an emergency threshold designed to preserve sufficient power in storage device 24 to communicate emergency information in the event of an emergency. Apparatus 12 may determine an emergency threshold, in addition to other thresholds, based on internal operations and through communications with other devices in system 10. For example, call center 14 may remotely program thresholds into apparatus 12 using any appropriate communications methods. Alternatively, apparatus 12 may determine thresholds based on available communications methods or other considerations. For example, apparatus 12 may determine an amount of energy required for emergency communications using station 16. This value may then be used as the emergency threshold. Also, apparatus 12 may add some margin to this value, including energy that may be required for retransmissions or other suitable values providing additional safety and/or backup energy.

Moreover, apparatus 12 may calculate an emergency threshold that accounts for multiple available communications methods. For example, apparatus 12 may be equipped for communications with both station 16 and satellite 18. Apparatus 12 determines an emergency threshold by summing the energy required for communicating emergency information with station 16 and the energy required for communicating emergency information with satellite 18. As with the emergency threshold calculated for communications solely with station 16, apparatus 12 may include some margin or other value to ensure an appropriate emergency threshold. In addition, while this example illustrates communications using station 16 and satellite 18, system 10 contemplates apparatus 12 using any number and type of suitable wireless or wireline communications methods.

Additionally, in determining available communications methods, apparatus 12, or the device calculating the threshold, may account for current subscriptions to various communications services. For example, while satellite 18 may be available for communications, the user of apparatus 12 may not have subscribed to a satellite communications service. Moreover, the user of apparatus 12 may have subscribed to particular types of services and/or emergency services. The different types of services may also be accounted for in determining various thresholds.

As previously stated, apparatus 12 may use multiple thresholds to determine various levels of service provided to users. For example, apparatus 12 may divide services into multiple levels, such as normal operations, restricted operations, and emergency operations. Using two different thresholds, apparatus may determine one of these three levels of service to provide to users. For example, above a restricted use threshold, apparatus 12 may provide normal operations; between an emergency threshold and the restricted use threshold, apparatus 12 may provide restricted services; and finally, when the energy level fails to exceed the emergency threshold, apparatus 12 may provide only emergency services. While this example illustrates a three-tiered approach, system 10 contemplates apparatus 12 using any number of different thresholds used to determine services to enable. Thus, at the extreme, apparatus 12 may use a different threshold for each service that may be provided.

In addition to thresholds used for determining levels of service, apparatus 12 may also use thresholds to switch between various available power sources. For example, apparatus 12 may determine an operational threshold used to determine whether to operate on power from power supply 26 or on power from storage device 24. In a particular embodiment, apparatus 12 determines an operational threshold and operates using power from energy storage device 24 so long as the energy remaining in energy storage device 24 remains above the operational threshold. When the energy remaining drops below the operational threshold, apparatus 12 uses power from power supply 26 if it is available. Thus, so long as the energy level remains sufficient, apparatus 12 can use the relatively clean power source afforded by storage device 24.

In addition to providing various levels of service and switching between different power sources, apparatus 12 may also include an indicator for communicating information relating to the energy level remaining in storage device 24 to a user. In a particular embodiment, apparatus 12 includes an indicator that signals the user of vehicle 20 when the energy level remaining in storage device 24 no longer exceeds the emergency threshold. This permits the user to take appropriate actions to replace or repair any defective components of vehicle 20 or apparatus 12.

FIG. 2 illustrates functional components of an exemplary apparatus 12 that include a controller 30, an indicator 32, energy storage device 24, a memory 34, communications interface 22, a crash detector 36, a global positioning system (GPS) device 38, and a vehicle interface 40. In general, controller 30 controls access to communications services provided by interface 22 based on the remaining energy in storage device 24. More specifically, controller 30 determines an emergency threshold to provide sufficient power to communicate emergency information using interface 22, monitors the energy level of energy storage device 24, and provides wireless services using interface 22 if the energy level exceeds the emergency threshold. As previously discussed, this emergency threshold is designed to ensure that storage device 24 maintains a sufficient energy level for emergency communications using interface 22.

Indicator 32 represents any audio or visual output device for communicating status information to a user of apparatus 12. For example, indicator 32 may be a light emitting diode (LED), a speaker that beeps or provides a voice prompt, or any other suitable device for communicating information to a user. In a particular embodiment, apparatus 12 uses indicator 32 to signal a user that the energy level remaining in storage device 24 has dropped below a threshold. Memory 34 represents any one or combination of volatile or non-volatile, local or remote devices suitable for storing data, for example, random access memory (RAM) devices, read only memory (ROM) devices, magnetic storage devices, optical storage devices, or any other suitable data storage devices. In a particular embodiment, memory 34 stores thresholds used by controller 30 in determining levels of service and in selecting between available power supplies. Crash detector 36 represents a component or components for detecting emergency situations. For example, crash detector 36 may be a component that detects the activation of an airbag within vehicle 20. GPS device 38 provides time and location information for apparatus 12. Vehicle interface 40 couples apparatus 12 to other components of vehicle 20, such as power supply 26.

In operation, interface 22 provides communications services for users of apparatus 12. For example, interface 22 may support phone calls, data communications sessions, vehicle status reports, location reporting, emergency communications, and other suitable services. In addition, interface 22 may permit call center 14 to communicate commands or other information with apparatus 12 and/or vehicle 20, such as a command to unlock the doors of vehicle 20. Controller 30 provides services and controls access based on thresholds that may be stored in memory 34. In a particular embodiment, controller 30 limits services provided only when power from power supply 26 is not available. Thus, controller 30 may only limit services when apparatus 12 is using power from storage device 24 and when the remaining energy of storage device 24 drops below some threshold.

For example, consider a situation in which apparatus 12 is unable to obtain power from power supply 26 and in which controller 30 uses an emergency threshold to determine levels of service. So long as the energy level of storage device 24 remains above the emergency threshold, controller 30 continues to provide normal services using the elements of apparatus 12. For example, controller 30 may routinely report location information from GPS device 38 to call center 14 using interface 22. However, without an opportunity to recharge, these transmissions and other services provided by apparatus 12 may slowly deplete storage device 24. When the energy level remaining in energy storage device 24 no longer exceeds the emergency threshold, controller 30 limits access to services to preserve sufficient power for emergency communications using interface 22. In addition, given a low energy level remaining in storage device 24, controller 30 may provide an indication or signal to a user using indicator 32. In the event of an emergency, such as an accident detected using crash detector 36, controller 30 provides emergency wireless communications using interface 22 regardless of the energy remaining in energy storage device 24.

While FIG. 2 illustrates specific functional modules for apparatus 12, system 10 contemplates implementing the functionalities described using any suitable combination and arrangement of hardware and/or software. In addition, functionalities from each of these modules may be combined or separated into smaller or larger functional units when appropriate, and any of the methods or functionalities described may be implemented by a computer program stored on a computer readable medium.

FIG. 3 is a chart illustrating service levels and power source selections based on the energy remaining in storage device 24 and various thresholds. On the left side, the chart indicates the level of wireless services provided by apparatus 12 based on the energy remaining in storage device 24 in relation to a restricted use threshold and an emergency threshold. So long as the energy level remains above the restricted use threshold, apparatus 12 provides full wireless services. Below the restricted use threshold but above the emergency threshold, apparatus 12 provides restricted wireless services. For example, apparatus 12 may restrict any communications sessions established using interface 22 except those to call center 14 in restricted wireless services. When the energy level in energy storage device 24 no longer exceeds the emergency threshold, the chart indicates that apparatus 12 provides only emergency wireless services.

However, while this example illustrates the use of two thresholds to determine the wireless services to provide using apparatus 12, system 10 contemplates apparatus 12 using any number and type of thresholds to determine the services to provide. Moreover, the services provided by apparatus 12 in each different service level may be selected using any appropriate criteria. In addition, while this example focuses on wireless services, apparatus 12 may provide any number and type of services, including services that do not require wireless communications or the use of interface 22. Furthermore, these services may be split into different levels and restricted according to the energy remaining in energy storage device 24 using any appropriate criteria.

In addition to indicating various levels of service, the chart also indicates power source selections for apparatus 12 based on an operational threshold. In this example, apparatus 12 selects between using power from a backup battery (such as storage device 24) or from a car (such as power supply 26 in vehicle 20). While the energy level remains above the operational threshold, apparatus 12 uses the relatively clean power supply provided by the backup battery. When the energy level of the backup battery drops below the operational threshold, apparatus 12 uses, if available, the car as the power source for apparatus 12. As with the thresholds for determining levels of service, apparatus 12 may use any number and type of thresholds for selecting between available power sources. Furthermore, the thresholds for selecting between power sources need not correlate to the thresholds used to determine levels of service.

FIG. 4 is a flowchart illustrating a method for determining an emergency threshold. While the description of this flowchart details the operation of apparatus 12, similar steps may be used by any suitable elements in system 10 to determine thresholds, with these thresholds then communicated to apparatus 12.

Apparatus 12 initializes an emergency threshold at step 100. For example, apparatus 12 sets the value of the emergency threshold to zero. Apparatus 12 determines an available wireless communications method at step 102. For example, apparatus 12 may determine services to which it is subscribed and then determine whether one of those services is available for communications. Apparatus 12 then determines the energy required for emergency transmissions using the available method at step 104. Apparatus 12 adds the energy required to the emergency threshold at step 106.

Apparatus 12 then determines whether other wireless communications methods are available at step 108. If so, apparatus 12 may repeat steps 102 through 106 for other available communications methods. Thus, apparatus 12 may determine an energy threshold that provides sufficient energy for attempting emergency communications using multiple communications methods. Once apparatus 12 determines that no other wireless communications methods are available, apparatus 12 adds a margin to the emergency threshold at step 110. This margin may account for effects such as the gradual loss of energy from energy storage device 24 even without use by apparatus 12.

While this flowchart presents a relatively simplistic method for determining an emergency threshold, system 10 contemplates apparatus 12 and/or other elements in system 10 using different or additional steps for determining an emergency threshold. For example, apparatus 12 may include sufficient energy in the emergency threshold for multiple retries using some or all of the available communications methods. In addition, the emergency threshold may reflect energy requirements for communications methods available on a projected route. For example, using GPS device 38, apparatus 12 may predict that vehicle 20 will no longer be in range of station 16 and that only satellite 18 will be available for emergency communications. Apparatus 12 may then take appropriate measures, such as increasing the emergency threshold, to preserve sufficient power for emergency transmissions using satellite communications.

FIG. 5 is a flowchart illustrating a method for determining levels of service to provide using multiple thresholds. Apparatus 12 determines an emergency threshold at step 120. This may include, for example, using steps similar to those outlined for the flowchart above, accessing a stored emergency threshold in memory 34, receiving the emergency threshold from a remote device such as call center 14, or any other appropriate techniques for determining an emergency threshold. Apparatus 12 determines a restricted use threshold at step 122. As with the emergency threshold, apparatus 12 may use any suitable techniques for determining the restricted use threshold. Apparatus 12 monitors the remaining energy level of energy storage device 24 at step 124. Apparatus 12 determines whether the energy level exceeds the emergency threshold at step 126. If so, apparatus 12 determines whether the energy level also exceeds the restricted use threshold at step 128. If so, apparatus 12 provides full wireless services at step 130 and continues monitoring the energy level of energy storage device 24 at step 124.

If apparatus 12 determines that the energy level does not exceed the emergency threshold at step 126, apparatus 12 provides only emergency services in the event of an emergency at step 134. Likewise, if apparatus 12 determines that the energy level does not exceed the restricted use threshold at step 128, apparatus 12 provides restricted wireless services at step 132. While providing restricted or emergency wireless services, apparatus 12 may continue to monitor the energy level to determine whether recharging has increased the energy level to indicate a higher level of service or whether continued depletion indicates a condition for a lowered level of service.

FIG. 6 is a flowchart illustrating a method for selecting between multiple available power sources based on the remaining energy level of storage device 24. Apparatus 12 determines an operational threshold at step 150. For example, apparatus 12 may receive the operational threshold from a remote device such as call center 14, access an operational threshold maintained by memory 34, or use other suitable techniques for determining an operational threshold. Apparatus 12 monitors the energy level for storage device 24 at step 152. Apparatus 12 determines whether vehicle power is available at step 154. For example, apparatus 12 may determine whether power is available from the car's alternator, the car's primary battery, or other similar power sources. If not, the method skips to step 158 and storage device 24 as the power source.

However, if vehicle power is available, apparatus 12 determines whether the energy level in storage device 24 exceeds the operational threshold at step 156. If so, apparatus 12 uses storage device 24 as the power source at step 158. Thus, if the vehicle power is not available, or if the vehicle power is available and the energy level of storage device 24 exceeds the operational threshold, then apparatus 12 uses storage device 24 as the power source, However, when using storage device 24 as the power source, apparatus 12 may limit access to services to preserve power for emergency communications. For example, while using storage device 24 as the power source, apparatus 12 may use a method such as that detailed for FIG. 5 above to determine various levels of service based on the remaining energy in storage device 24. If vehicle power is available but the energy level remaining in storage device 24 does not exceed the operational threshold, apparatus 12 uses the vehicle as the power source at step 160.

While the preceding flowcharts illustrate, exemplary methods for determining an emergency threshold, determining levels of service, and selecting between available power sources, system 10 contemplates using any suitable techniques for effecting these various processes. In addition, while these flowcharts illustrate methods containing specific steps performed in a particular order, many of the steps in these flowcharts may take place simultaneously and/or in different orders than as shown. Furthermore, system 10 contemplates using methods with additional steps, fewer steps, or different steps, so long as the methods remain appropriate for determining thresholds, determining levels of service, and selecting between available power sources.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus comprising:
   a wireless device operable to provide wireless communications, the wireless device operable to establish a first wireless link using a first available method for wireless communications and to establish a second wireless link using a second available method for wireless communications;
   an energy storage device operable to provide power for the wireless device and to report an energy level indicating remaining energy for the energy storage device; and
   a controller operable to:
      determine a first power requirement for communicating emergency information using the first available method;
      determine a second power requirement for communicating the emergency information using the second available method;
      determine an emergency threshold to provide sufficient energy to communicate the emergency information using the wireless device, wherein the emergency threshold is equal to or greater than a sum of the first power requirement and the second power requirement;
      monitor the energy level; and
      provide wireless services using the wireless device if the energy level exceeds the emergency threshold.

2. The apparatus of claim 1, wherein the controller receives the emergency threshold from a remote host using the wireless device.

3. The apparatus of claim 1, wherein the controller determines the emergency threshold based on an energy requirement for communicating the emergency information using an available method for wireless communications.

4. The apparatus of claim 1, wherein the controller is further operable to:
   determine an operational threshold;
   select the energy storage device to power the wireless device if the energy level of the energy storage device exceeds the operational threshold; and
   select a vehicle power supply to power the wireless device if the energy level of the energy storage device does not exceed the operational threshold.

5. The apparatus of claim 1, wherein the controller is further operable to:
   determine a restricted use threshold;
   provide the wireless services using the wireless device if the energy level exceeds the restricted use threshold; and
   provide restricted wireless services if the energy level exceeds the emergency threshold and does not exceed the restricted use threshold, wherein the restricted wireless services comprise a subset of the wireless services.

6. The apparatus of claim 1, wherein the first wireless link provides communications between the apparatus and a terrestrial receiver, and the second wireless link provides communications between the apparatus and a space-based receiver.

7. The apparatus of claim 1, further comprising:
   a location detection device;
   a crash detector; and
   the controller further operable to receive a crash indication from the crash detector and, in response, to determine a current location using the location detection device, wherein the emergency information comprises the current location.

8. A method for controlling wireless communications comprising:
   identifying a first available method for establishing a first wireless link;
   determining a first power requirement for communicating emergency information using the first available method;
   identifying a second available method for establishing a second wireless link;
   determining a second power requirement for communicating the emergency information using the second available method;
   determining an emergency threshold that provides sufficient power for a wireless device to communicate the emergency information, wherein the emergency threshold is equal to or greater than a sum of the first power requirement and the second power requirement;
   monitoring an energy level for an energy storage device;
   providing wireless services using the wireless device if the energy level exceeds the emergency threshold.

9. The method of claim 8, further comprising receiving the emergency threshold from a remote host using the wireless device.

10. The method of claim 8, further comprising determining the emergency threshold based on a power requirement for communicating the emergency information using an available method for wireless communications.

11. The method of claim 8, further comprising:
    determining an operational threshold;
    powering the wireless device using power from the energy storage device if the energy level of the energy storage device exceeds the operational threshold; and
    powering the wireless device using power from the vehicle if the energy level of the energy storage device does not exceed the operational threshold.

12. The method of claim 8, further comprising:
    determining a restricted use threshold;
    providing the wireless services using the wireless device if the energy level exceeds the restricted use threshold; and
    providing restricted wireless services if the energy level exceeds the emergency threshold and does not exceed the restricted use threshold, wherein the restricted wireless services comprise a subset of the wireless services.

13. The method of claim 8, wherein the first wireless link provides for communications with a terrestrial receiver, and the second wireless link provides for communications with a space-based receiver.

14. The method of claim 8, further comprising:

receiving a crash indication;

determining a current location using a location detection device;

incorporating the current location within the emergency information; and communicating the emergency information using at least one of the first available method and the second available method.

15. An apparatus comprising:

means for establishing a first wireless link using a first available method for wireless communications;

means for determining a first power requirement for communicating emergency information using the first available method;

means for establishing a second wireless link using a second available method for wireless communications;

means for determining a second power requirement for communicating the emergency information using the second available method;

means for determining an emergency threshold that provides sufficient power for a wireless device to communicate the emergency information, wherein the emergency threshold is equal to or greater than a sum of the first power requirement and the second power requirement;

means for monitoring an energy level for an energy storage device;

means for providing wireless services using the wireless device if the energy level exceeds the emergency threshold.

16. The apparatus of claim 15, further comprising means for receiving the emergency threshold from a remote host.

17. The apparatus of claim 15, further comprising means for determining the emergency threshold based on a power requirement for communicating the emergency information using an available method for wireless communications.

18. The apparatus of claim 15, further comprising:

means for determining an operational threshold;

means for selecting the energy storage device to power the wireless device if the energy level of the energy storage device exceeds the operational threshold; and means for selecting a vehicle power supply to power the wireless device if the energy level of the energy storage device does not exceed the operational threshold.

19. The apparatus of claim 15, further comprising:

means for determining a restricted use threshold;

means for providing the wireless services using the wireless device if the energy level exceeds the restricted use threshold; and means for providing restricted wireless services if the energy level exceeds the emergency threshold and does not exceed the restricted use threshold, wherein the restricted wireless services comprise a subset of the wireless services.

20. The apparatus of claim 15, wherein the first wireless link provides communications between the apparatus and a terrestrial receiver, and the second wireless link provides communications between the apparatus and a space-based receiver.

* * * * *